(12) United States Patent  
Adcock et al.

(10) Patent No.: US 7,937,315 B2  
(45) Date of Patent: May 3, 2011

(54) PORTFOLIO EXECUTION AND REPORTING

(75) Inventors: Paul D. Adcock, Burr Ridge, IL (US); Michael A. Cormack, Evanston, IL (US); Thomas F. Haller, Longwood, FL (US); Robert A. Hill, LaGrange, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 515 days.

(21) Appl. No.: 11/345,421

(22) Filed: Jan. 31, 2006

(65) Prior Publication Data

US 2006/0253375 A1 Nov. 9, 2006

Related U.S. Application Data

(60) Provisional application No. 60/677,963, filed on May 5, 2005.

(51) Int. Cl.  
*G06Q 40/00* (2006.01)

(52) U.S. Cl. ........................................................ 705/37

(58) Field of Classification Search .................... 705/37, 705/36 R, 35  
See application file for complete search history.

(56) References Cited

U.S. PATENT DOCUMENTS

| | | |
|---|---|---|
| 5,101,353 A | 3/1992 | Lupien et al. |
| 5,560,580 A | 10/1996 | Almoslino |
| 5,845,266 A | 12/1998 | Lupien et al. |
| 5,905,974 A | 5/1999 | Fraser et al. |
| 5,950,176 A | 9/1999 | Keiser et al. |
| 6,012,046 A | 1/2000 | Lupien et al. |
| 6,098,051 A | 8/2000 | Lupien et al. |
| 6,278,982 B1 | 8/2001 | Korhammer et al. |
| 6,343,278 B1 | 1/2002 | Jain et al. |
| 6,377,940 B2 | 4/2002 | Tilfors et al. |
| 6,405,180 B2 | 6/2002 | Tilfors et al. |
| 6,408,282 B1 | 6/2002 | Buist |
| 6,505,174 B1 | 1/2003 | Keiser et al. |
| 6,615,188 B1 | 9/2003 | Breen et al. |
| 6,618,707 B1 | 9/2003 | Gary |
| 6,714,948 B1 | 3/2004 | Richards |
| 6,829,589 B1 | 12/2004 | Saliba |
| 6,832,210 B1 | 12/2004 | Li |
| 6,850,907 B2 | 2/2005 | Lutnick et al. |
| 6,963,856 B2 | 11/2005 | Lutnick et al. |
| 6,983,260 B2 | 1/2006 | Hummelgren |
| 7,162,448 B2 | 1/2007 | Madoff et al. |

(Continued)

FOREIGN PATENT DOCUMENTS

AU 2006/244479 11/2006

(Continued)

OTHER PUBLICATIONS

Lee W. Young, "International Search Report", Sep. 7, 2007, 5 pages.

(Continued)

*Primary Examiner* — Hani Kazimi  
(74) *Attorney, Agent, or Firm* — Milbank Tweed Hadley & McCloy LLP

(57) ABSTRACT

A program trade order process and related market center are disclosed which accumulate program trade orders throughout the trading day and execute the accumulated program trade orders at a designated time. The process disclosed provides trade reporting and order surveillance capabilities as well.

24 Claims, 4 Drawing Sheets

U.S. PATENT DOCUMENTS

| | | |
|---|---|---|
| 7,184,982 B1 | 2/2007 | Howorka et al. |
| 7,197,483 B2 | 3/2007 | Brady et al. |
| 7,209,896 B1 | 4/2007 | Serkin et al. |
| 7,225,153 B2 | 5/2007 | Lange |
| 7,242,669 B2 | 7/2007 | Bundy et al. |
| 7,246,090 B1 | 7/2007 | Thomas |
| 7,246,093 B1 | 7/2007 | Katz |
| 7,249,086 B2 | 7/2007 | Bloom et al. |
| 7,356,498 B2 | 4/2008 | Kaminsky et al. |
| 7,383,220 B1 * | 6/2008 | Keith .......................... 705/37 |
| 7,401,046 B2 | 7/2008 | Hollerman et al. |
| 7,467,110 B2 | 12/2008 | Muller et al. |
| 7,685,057 B2 | 3/2010 | Chiulli et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1 | 10/2002 | Serkin et al. |
| 2002/0169703 A1 | 11/2002 | Lutnick et al. |
| 2002/0184135 A1 | 12/2002 | Zakaria |
| 2002/0184136 A1 | 12/2002 | Cleary |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore et al. |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1 | 2/2004 | Tilfors et al. |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 * | 7/2006 | Littlewood ..................... 705/37 |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |
| 2010/0030704 A1 | 2/2010 | Griffin et al. |

FOREIGN PATENT DOCUMENTS

| | | |
|---|---|---|
| AU | 2006/244483 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 9/2003 |
| JP | 2008/510226 | 11/2007 |
| JP | 2008/510109 | 11/2008 |
| JP | 2008/510110 | 11/2008 |
| JP | 2008/510238 | 11/2008 |
| SG | 2007/166754 | 11/2007 |
| SG | 2007/166770 | 11/2007 |
| SG | 2007/166788 | 11/2007 |
| SG | 2007/166796 | 11/2007 |
| SG | 2007/166804 | 11/2007 |
| SG | 2007/166812 | 11/2007 |
| SG | 2007/166762 | 12/2007 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 02/07039 | 1/2002 |
| WO | WO 02/09008 | 1/2002 |
| WO | WO 2004/008296 | 1/2004 |
| WO | WO 2005/010790 | 2/2005 |
| WO | WO 2005/036354 | 4/2005 |

| | | |
|---|---|---|
| WO | PCTUS2006016683 | 11/2006 |
| WO | PCTUS2006016684 | 11/2006 |
| WO | PCTUS2006016685 | 11/2006 |
| WO | PCTUS2006016701 | 11/2006 |
| WO | PCTUS2006017249 | 11/2006 |
| WO | PCTUS2006017253 | 11/2006 |
| WO | PCTUS2006017296 | 11/2006 |
| WO | PCTUS2006036461 | 4/2007 |
| WO | PCTUS2006036878 | 4/2007 |
| WO | PCTUS2007016572 | 1/2008 |
| WO | PCTUS2007016682 | 1/2008 |
| WO | PCTUS2007016856 | 1/2008 |
| WO | PCTUS2007016857 | 1/2008 |
| WO | PCTUS2007016718 | 2/2008 |
| WO | PCTUS2007016571 | 3/2008 |
| WO | PCTUS2007024921 | 6/2008 |
| WO | WO 01/22322 | 3/2010 |

OTHER PUBLICATIONS

Australian Patent Office Written Opinion and Search Report, mailed Feb. 13, 2009.
International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007/024921, Jun. 18, 2009.
McKinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
International Search Report, Mar. 20, 2008 for PCT/US2007/016718.
Young, Lee, W., International Search Report Sep. 29, 2007, 6 pages.
Australian Patent Office Written Opinion & Search Report, mailed Dec. 1, 2008.
Australian Patent Office Written Opinion & Search Report, mailed Jan. 9, 2009.
International Search Report, Jul. 2, 2008 for PCT/US2007/016572.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for U.S. Appl. No. 11/345,420.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol, 60, Iss. 13, p. 16, 5 pages.
Headstrong Buys assets of Elind Software Provider; Noticiasfinancieras, Miami Nov. 1, 2004, p. 1.
Non-Final Rejection, Feb. 26, 2008.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
International Search Report, Sep. 5, 2008 for PCT/US2007/016857.
International Search Report, Jun. 17, 2008 for PCT/US2007/016682.
International Search Report, Nov. 10, 2008 for PCT/US2007/016856.
International Search Report, Sep. 18, 2008 for PCT/US2007/016856.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
Non-Final Rejection, Apr. 4, 2008 for U.S. Appl. No. 11/416,710.
Informal Response to Non-Final, Aug. 4, 2008 for U.S. Appl. No. 11/416,710.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
International Search Report, Jun. 17, 2008 for PCT/US2007/016571.
Examiner Interview Summary Record, Aug. 18, 2009 for U.S. Appl. No. 11/122,689.
Response to Nonfinal, Aug. 27, 2009 for U.S. Appl. No. 11/122,689.
Notice of Allowance, Aug. 21, 2009 for U.S. Appl. No. 11/122,679.
Examiner Interview Summary Record, Sep. 9, 2009 for U.S. Appl. No. 11/122,679.
Examiner Interview Summary Record, Aug. 18, 2009 for U.S. Appl. No. 11/122,498.
Response to Nonfinal, Sep. 15, 2009 for U.S. Appl. No. 11/122,498.
Response to Final, Sep. 30, 2009 for U.S. Appl. No. 11/416,942.
International Search Report, Oct. 2, 2009 for SG2007166812.
International Search Report, Oct. 14, 2009 for SG2007166754.
Nonfinal Rejection, Sep. 30, 2009 for U.S. Appl. No. 11/416,943.
NASDAQ Launches Liquidity Tracker, HighBeam Research, Dec. 5, 2002.
Response to Nonfinal, Sep. 29, 2009 for U.S. Appl. No. 11/634,020.
Response to Final, Oct. 19, 2009 for U.S. Appl. No. 11/416,913.
Nonfinal Rejection, Aug. 17, 2009 for U.S. Appl. No. 11/416,710.
Response to Nonfinal, Nov. 2, 2009 for U.S. Appl. No. 11/416,710.
Response to Final, Oct. 7, 2009 for U.S. Appl. No. 11/416,942.
Examiner Interview Summary, Oct. 14, 2009 for U.S. Appl. No. 11/416,942.
Response to Nonfinal, Nov. 6, 2009 for 416,756.
A Taxonomy of Automated Trade Execution Systems, Ian Domowitz, Journal of International Money and Finance, (1993), 12, pp. 607-631.
U.S. Appl. No. 61/191,055, Neuner, et al.
U.S. Appl. No. 11/881,788, Adcock, et al.
U.S. Appl. No. 11/881,789, filed Sep. 18, 2009, Adcock, et al.

U.S. Appl. No. 60/721,165, Drake, et al.
U.S. Appl. No. 11/122,679, Adcock, et al.
U.S. Appl. No. 11/122,689, filed Jul. 27, 2010, Adcock, et al.
U.S. Appl. No. 11/345,420, filed Nov. 9, 2006, Adcock, et al.
U.S. Appl. No. 11/881,064, filed Sep. 18, 2009, Adcock, et al.
U.S. Appl. No. 11/634,020, filed Jun. 5, 2008, Jimenez, et al.
U.S. Appl. No. 11/122,498, Brill, et al.
U.S. Appl. No. 11/880,852, Armstrong, et al.
U.S. Appl. No. 11/880,686, filed Jan. 29, 2009, Haller, et al.
U.S. Appl. No. 11/880,840, filed Mar. 12, 2009, Adcock, et al.
U.S. Appl. No. 11/527,797, filed Mar. 29, 2007, Drake, et al.
U.S. Appl. No. 11/416,942, filed Nov. 9, 2006, Adcock, et al.
U.S. Appl. No. 11/525,363, filed Apr. 5, 2007, Cormack, et al.
U.S. Appl. No. 11/416,943, filed Nov. 9, 2006, Adcock, et al.
U.S. Appl. No. 11/416,756, filed Nov. 9, 2006, Adcock, et al.
U.S. Appl. No. 11/416,710, filed Nov. 9, 2006, Adcock, et al.
U.S. Appl. No. 11/416,913, filed Nov. 9, 2006, Adcock, et al.
Roger D. Huang et al., Tick Size, Bid-Ask Spreads and Market Structure, Working Paper 99-05 Version: Feb. 8, 2001; Forthcoming Journal of Financial and Quant. Analysis p. 1-29.
Bart Frijns et al., Price discovery in tick time, Journal of Empirical Financial, vol. 16, Issue 5, Dec. 2009, p. 759-776.
Tseng, K.C., Supermontage as a New Trading System of NASDAQ, Investment Management and Financial Innovations, Mar. 2005.
Schnitzlein, Charles R., Call and Continuous Trading Mechanisms Under Asymmetric Information: An Experimental Investigation, The Journal of Finance, vol. 51, No. 2, p. 613-636.
Dec. 14, 2009 Notice of Allowance for U.S. Appl. No. 11/122,689.
Jan. 26, 2010 Notice of Allowance for U.S. Appl. No. 11/122,689.
Mar. 1, 2010 Notice of Allowance for U.S. Appl. No. 11/122,689.
Jan. 15, 2010 Notice of Allowance for U.S. Appl. No. 11/122,679.
Nov. 16, 2009 Notice of Allowance for U.S. Appl. No. 11/345,420.
Jan. 21, 2010 Examiner Interview for U.S. Appl. No. 11/122,498.
Jan. 21, 2010 Final Rejection for U.S. Appl. No. 11/122,498.
Dec. 29, 2009 Notice of Allowance for U.S. Appl. No. 11/416,942.
Jan. 26, 2010 Notice of Allowance for U.S. Appl. No. 11/416,942.
Feb. 24, 2010 Notice of Allowance for U.S. Appl. No. 11/416,942.
Mar. 22, 2010 Notice of Allowance for U.S. Appl. No. 11/416,710.
Jan. 22, 2010 Nonfinal Rejection for U.S. Appl. No. 11/416,913.
Apr. 27, 2010 Final Rejection for U.S. Appl. No. 11/416,756.
Dec. 14, 2009 Response to Nonfinal for U.S. Appl. No. 11/416,943.
Mar. 23, 2010 Nonfinal Rejection for U.S. Appl. No. 11/416,943.
Nov. 16, 2009 Response to Nonfinal for U.S. Appl. No. 11/525,363.
Aug. 12, 2009 Nonfinal Rejection for U.S. Appl. No. 11/527,797.
Nov. 17, 2009 Response to Nonfinal for U.S. Appl. No. 11/527,797.
Jan. 26, 2010 Final Rejection for U.S. Appl. No. 11/527,797.
Dec. 28, 2009 Final Rejection for U.S. Appl. No. 11/634,020.
Mar. 17, 2010 Response to Final for U.S. Appl. No. 11/634,020.
Apr. 28, 2010 Nonfinal rejection for U.S. Appl. No. 11/634,020.
Nov. 6, 2009 Nonfinal Rejection for U.S. Appl. No. 11/880,686.
May 3, 2010 Response to Nonfinal for U.S. Appl. No. 11/880,686.
Dec. 1, 2009 Nonfinal Rejection for U.S. Appl. No. 11/881,789.
Mar. 19, 2010 Response to Nonfinal for U.S. Appl. No. 11/881,789.
Aug. 16, 2010 Notice of Allowance for U.S. Appl. No. 11/122,679.
Jul. 22, 2009 EIC3600 Search Report for U.S. Appl. No. 11/122,679.
Jul. 2, 2009 EIC3600 Search Report for U.S. Appl. No. 11/345,420.
Jun. 16, 2010 Response to Final for U.S. Appl. No. 11/122,498.
Jul. 1, 2010 Notice of Allowance for U.S. Appl. No. 11/122,498.
Aug. 4, 2010 Notice of Allowance for U.S. Appl. No. 11/345,421.
Jun. 16, 2010 Notice of Allowance for U.S. Appl. No. 11/416,942.
Jun. 15, 2010 Notice of Allowance for U.S. Appl. No. 11/416,710.
Jan. 30, 2009 Austrian Patent Office Search Report and Written Opinion for SG 200716681-2.
Jun. 22, 2010 Response to Final Rejection for U.S. Appl. No. 11/416,913.
Jun. 23, 2010 Response to Nonfinal for U.S. Appl. No. 11/416,943.
Jul. 6, 2010 Proposed Examiner's Amendment for U.S. Appl. No. 11/525,363.
Aug. 3, 2010 Notice of Abandonment for U.S. Appl. No. 11/527,797.
Jul. 28, 2010 Response to Office Action for U.S. Appl. No. 11/634,020.
Jul. 6, 2010 Nonfinal rejection for U.S. Appl. No. 11/880,840.
Jul. 21, 2010 Final Office Action for U.S. Appl. No. 11/880,686.
Aug. 18, 2008 Final Rejection for U.S. Appl. No. 11/880,852.
Jun. 30, 2010 Nonfinal Rejection for U.S. Appl. No. 11/881,064.
Aug. 20, 2010 Restrict Requirement for U.S. Appl. No. 11/881,789.
Jun. 29, 2010 Nonfinal Rejection for U.S. Appl. No. 11/881,788.
U.S. Appl. No. 12/807,338, Adcock, et al.
U.S. Appl. No. 12/928,292, Adcock, et al.
John Hintze, Direct Order Decision Polarizes Exchanges, Security Industry News, Jun. 13, 2005, Securities Data Publishing.
Peter Chapman, Special Feature: Fragmented Dealing Under Fire, Traders, May 1, 2000, Securities Data Publishing.
Oct. 14, 2010 Notice of Allowance, for U.S. Appl. No. 11/122,679.
Sep. 7, 2010 Notice of Allowance, for U.S. Appl. No. 11/345,420.
Aug. 31, 2010 Notice of Allowance, for U.S. Appl. No. 11/122,498.
Sep. 14, 2010 Notice of Allowance, for U.S. Appl. No. 11/122,498.
Sep. 29, 2010 Notice of Allowance, for U.S. Appl. No. 11/122,498.
Oct. 13, 2010 Supplemental Notice of Allowability, for U.S. Appl. No. 11/122,498.
Sep. 20, 2010 Notice of Allowance, for U.S. Appl. No. 11/416,942.
Nov. 9, 2010 Supplemental Notice of Allowability, for U.S. Appl. No. 11/416,942.
Sep. 27, 2010 Notice of Allowance, for U.S. Appl. No. 11/416,710.
Sep. 15, 2010 Final Rejection, for U.S. Appl. No. 11/416,913.
Aug. 26, 2010 Final Rejection, for U.S. Appl. No. 11/416,943.
Sep. 24, 2010 Notice of Allowance, for U.S. Appl. No. 11/525,363.
Oct. 27, 2010 Notice of Allowance, for U.S. Appl. No. 11/634,020.
Jun. 11, 2009 EIC3600 Search Report, for U.S. Appl. No. 11/634,020.
Mar. 17, 2010 Restriction Requirement, for U.S. Appl. No. 11/880,840.
Mar. 26, 2010 Response to Restriction, for U.S. Appl. No. 11/880,840.
Nov. 4, 2010 Response to Non-final, for U.S. Appl. No. 11/880,840.
Dec. 7, 2010 Notice of Allowance, for U.S. Appl. No. 11/880,840.
Nov. 15, 2010 Response to Final, for U.S. Appl. No. 11/880,686.
Sep. 2, 2010 Response to Restriction Requirement, for U.S. Appl. No. 11/881,789.
Sep. 29, 2010 Response to Non-final, for U.S. Appl. No. 11/881,788.
Nov. 15, 2010 Notice of Allowance and Interview Summary, for U.S. Appl. No. 11/881,788.
Dec. 15, 2010 Supplemental Notice of Allowance, for U.S. Appl. No. 11/122,679.
Dec. 28, 2010 Supplemental Notice of Allowability, for U.S. Appl. No. 11/416,942.
Jan. 18, 2011 Response to Final Rejection, for U.S. Appl. No. 11/416,913.
Dec. 29, 2010 Notice of Allowance, for U.S. Appl. No. 11/634,020.
Jan. 6, 2011 Notice of Allowance, for U.S. Appl. No. 11/881,788.
Feb. 2, 2011 Final Rejection, for U.S. Appl. No. 11/881,789.

* cited by examiner

PORTFOLIO EXECUTION AND REPORTING

CROSS-REFERENCE TO RELATED APPLICATIONS

This application claims priority from and claims the benefit of U.S. Provisional Application No. 60/677,963, filed May 5, 2005, entitled "Portfolio Execution and Reporting Facility", which is hereby incorporated by reference.

BACKGROUND

Portfolio traders manage portfolios of stocks and/or other financial instruments and, when they trade, they often times make large dollar value trades in a number of different stocks or other instruments. Portfolio traders are typically fund managers or traders and brokers acting on behalf of a large institution, such as a mutual find or a money-management firm. Portfolio traders employ a variety of different trading strategies to manage their portfolios, and they use program trading to implement these strategies.

A program trade is a series of related purchases or sales of a group of securities where the related purchases and sales satisfy parameters for a minimum number of securities and a minimum market value. The specific parameters of a program trade are defined by market regulations, which currently define a program trade as the purchase or sale of a basket of at least fifteen securities with a total market value of at least one million dollars.

Several limitations exist in prior systems in which program trade orders are executed. For example, in some prior systems, where the portfolio trader executes his program trade orders on an exchange in the market place, the portfolio trader is required to execute the orders during the trading day. If the size of the trade print is large enough, executing this order during the trading day will likely have the negative effect of moving the market away from the position of the portfolio trader that executed the order. This is due to the fact that trades executed within the marketplace are reported immediately. Furthermore, program trade orders executed on an exchange during the trading day run the risk of being broken up due to interaction with the marketplace. Such market interaction poses a serious issue for a trader because a trader wants the program trade orders that make up the program trade to each cross cleanly at a single price. With market interaction, an individual program trade order that is part of the program trade gets separated into a matched portion that crosses and an unmatched portion which must be executed manually. The result is that the individual program trade order ends up getting traded, potentially, at multiple prices.

To remedy this problem, portfolio traders often execute such program trade orders off the exchange (e.g., at an institutional trading desk or within an alternative trading system such as a crossing network). While this method resolves the trader's problem by keeping large orders from interacting with the marketplace and from having execution of the order reported out immediately and potentially negatively moving the market, such order executions must still be reported. Marketplace rules require that executed trades be reported to an exchange or comparable public market center. Program trade orders that are executed off an exchange typically are reported either at the end of the day as aggregated program trade totals, with the details of the execution being reported over the next several days, or reported the next morning as individual trades.

Crossing systems have been developed where program trade orders may be executed on a public exchange, and execution of such orders is captured for market reporting. For example, the New York Stock Exchange ("NYSE") offers a special trading session (i.e. Crossing Session II) where program trade orders may be received and executed on the NYSE at the end of the day, after the market has closed.

Accordingly, there is a need for a crossing system that allows traders to submit their program trade orders throughout the trading day at the trader's convenience for execution at a pre-specified time so that these orders do not interact with other orders on the exchange.

SUMMARY

According to an aspect of the present invention, a method for processing a program trade, includes providing a crossing market center and designating a portfolio crossing session start time outside of normal market trading hours and throughout the trading day until the designated portfolio crossing session start time, receiving and storing a plurality of program trade orders at the crossing market center, wherein each program trade order contains a basket identification number identifying the program trade that the program trade order is part of. It further includes, at the designated start time, initiating a portfolio crossing session and executing the received program trade orders, resulting in portfolio crosses. It further includes linking together the completed portfolio crosses having the same basket identification number.

DESCRIPTION OF THE DRAWINGS

These and other features, aspects and advantages of the present invention will become better understood with regard to the following description, appended claims and accompanying drawings where:

DETAILED DESCRIPTION

Figure 1:
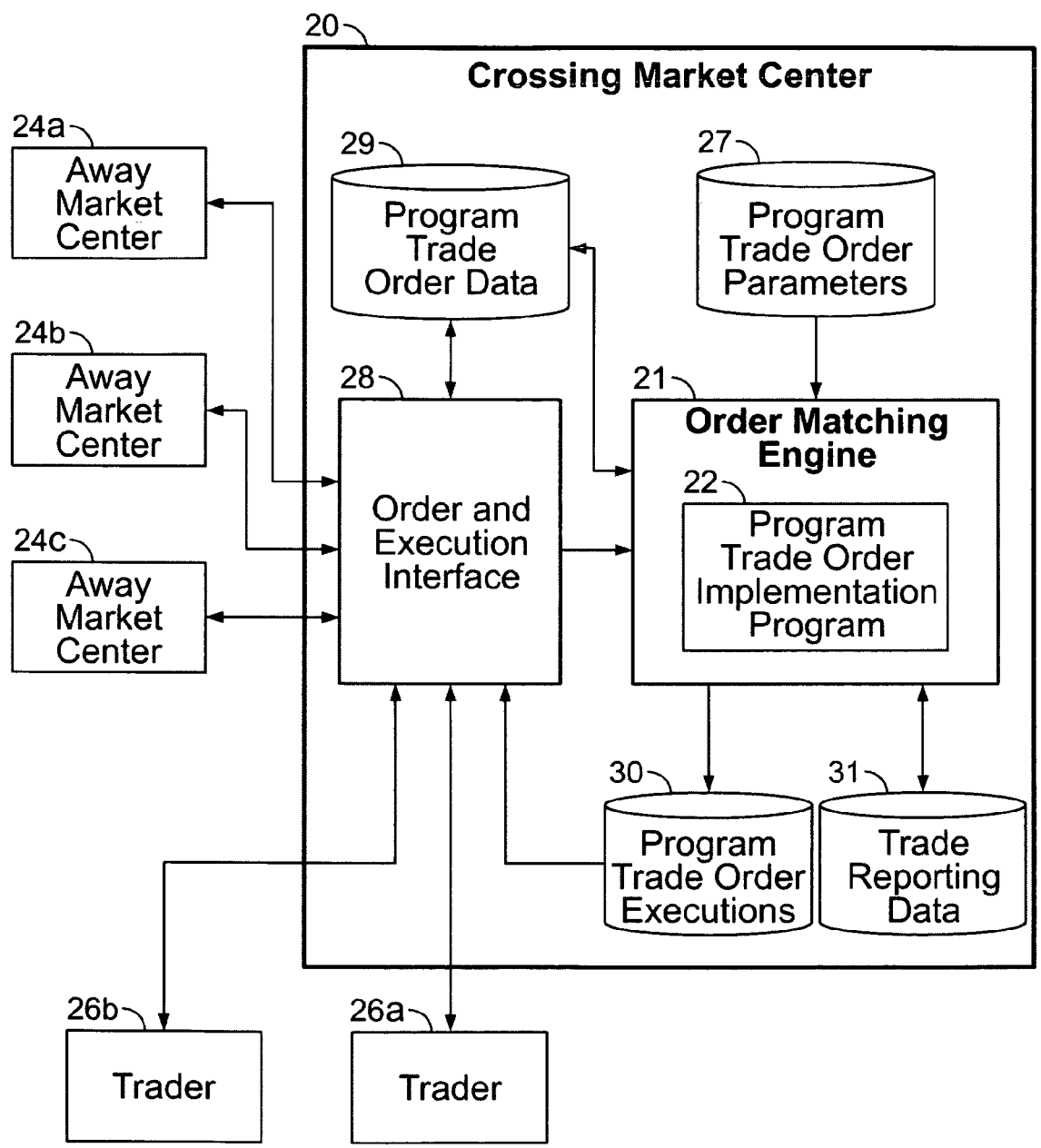
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., securities, futures contracts, options, bonds, etc.). The trading environment of this embodiment includes a crossing market center 20 which interacts with a number of other market centers 24 (i.e. away market centers) and traders 26. It should be understood that the crossing market center 20 referred to herein refers to a computing system having sufficient processing and memory capabilities and does not refer to a specific physical location. In fact, in certain embodiments, the computing system may be distributed over several physical locations. It should also be understood that any number of traders 26 or away market centers 24 can interact with the crossing market center 20. The crossing market center 20 is the market center to which a portfolio trader 26 sends a specific program trade order. The crossing market center 20 includes an order matching engine 21, which validates, matches and processes all orders on the market center 20. In this embodiment, the order matching engine 21 includes a program trade order implementation program 22, which functions to facilitate the execution of program trade orders sent to the crossing market center 20. The program trade order implementation program 22 may also be utilized as stand alone code separate and apart from the order matching engine 21. In this embodiment, the code for the order matching engine 21 and for the program trade order implementation program 22 are stored in the crossing market center's memory.

The crossing market center 20 may also include a program trade order parameters data structure 27. The program trade order parameters data structure 27 stores pre-defined parameters and rules that are used by the order matching engine 21 in executing program trade orders (e.g., portfolio crossing session start time, program trade order definition parameters such as minimum number of symbols in a portfolio and minimum portfolio value parameters, etc.). The crossing market center 20 may also include an order and execution interface 28 which interacts with the traders 26, the away market centers 24 and the order matching engine 21 in crossing a program trade order and, in this embodiment, the regular order execution process. The crossing market center 20 may also include a program trade order data structure 29 where program trade order information is stored, an order execution data structure 30 where executed order information is stored and a trade reporting data structure 31 where trade reporting information is stored (e.g., trade reporting rules and the tape data for trade reports).

Throughout the discussion herein, it should be understood that the details regarding the operating environment, data structures, and other technological elements surrounding the crossing market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Incoming Program Trade Order

Figure 2:
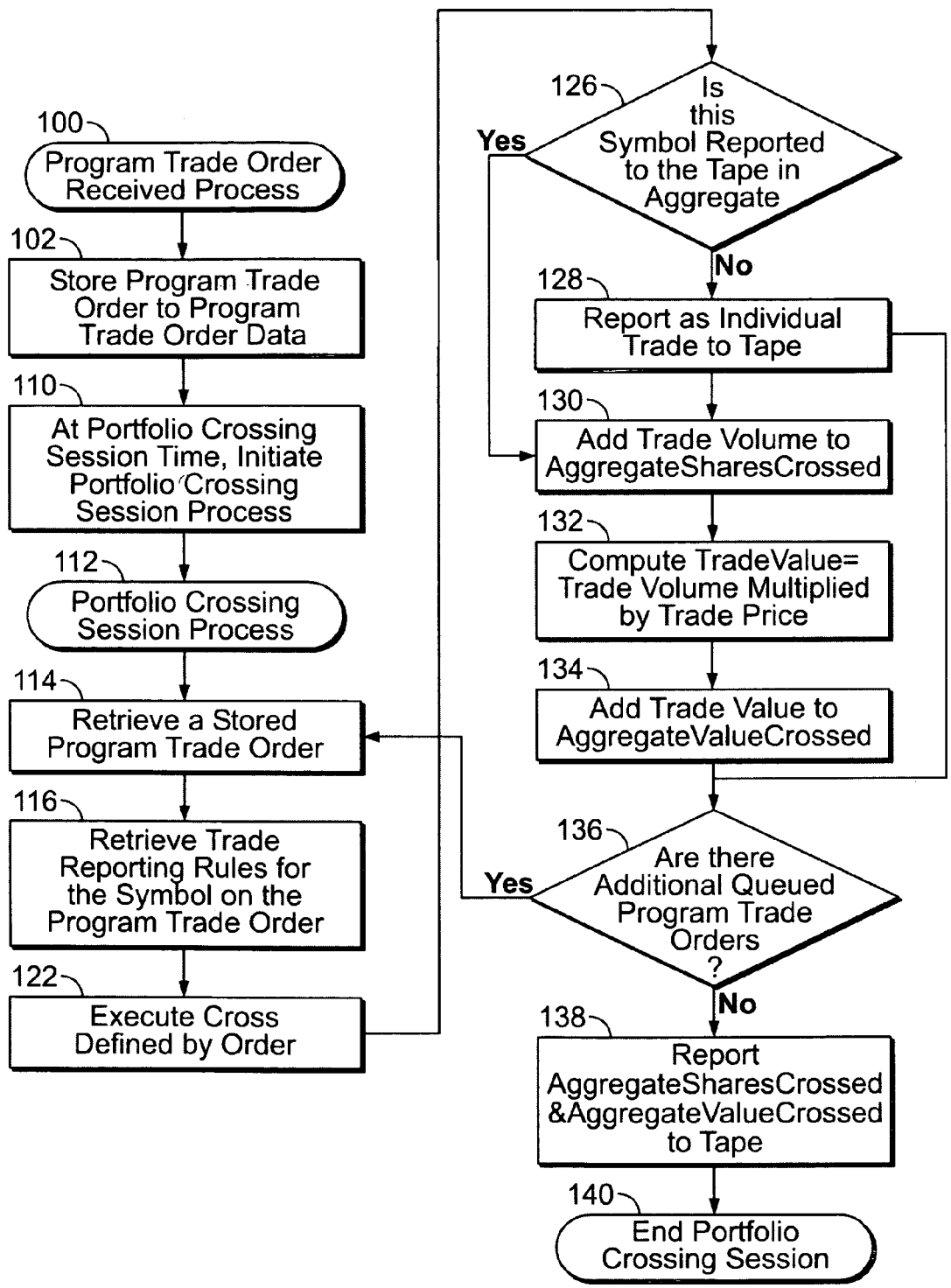
FIG. 2 illustrates the process implemented by a portfolio cross order implementation program when the program receives a portfolio cross order.

Referring to FIG. 2, at step 100, a new program trade order is received by the order matching engine 21. The order matching engine 21, recognizing the program trade order designation, stores the program trade order to the program trade order data structure 29 and queues this order for later execution, as indicated at step 102. The program trade order has an order identification number and a basket identification number that are assigned by the trader 26 that sent the order. The order identification number acts as a reference and tracking identifier for that order, and the basket identification number is a reference which links all of the orders in the portfolio basket of crosses together. Since program trade orders are created so that they do not need to interact with the general market, price/time priority rules, from an order matching standpoint, are irrelevant. As every order is guaranteed to execute at its specified order price, the process simply stores the received program trade orders for each symbol in the order in which such order was received. The process can optionally store the orders according to symbol or basket identification number or can simply store all the received orders sequentially in a single file. As each order represents a self-contained cross, the sequence in which the orders are stored is irrelevant. The stored program trade orders, in this embodiment, are not displayed on the crossing market center's order book or to the general marketplace in any manner, which keeps the trader's trading intentions from the market.

The portfolio crossing time parameter (e.g. "Portfolio Crossing Time") is a pre-set parameter which sets the time that the daily portfolio crossing session commences and resides in the program trade order parameters data structure 27. As indicated at step 110, at the point in the day when the portfolio crossing time parameter is reached, the process initiates a portfolio crossing session, as indicated at step 112. Typically, the portfolio crossing session is set up to execute outside of normal market hours to keep the portfolio crossing orders from interacting with the market. However, it should be understood that the start time for the portfolio crossing session can be set for any time (e.g. set for prior to market opening rather than after the close of the market) and that the process can be set up to conduct more than one portfolio crossing session in a day if desired (e.g. one prior to the market opening and one after the close of the market). Also, it should be understood that, in this embodiment, submitted program trade orders stored on the program trade order data structure 29 may be modified and/or canceled prior to the commencement of the portfolio crossing session.

The portfolio crossing session commences by retrieving a program trade order stored in the program trade order data structure 29, as indicated at step 114. At step 116, the process retrieves the Trade Reporting rule for the symbol in the program trade order record. At step 122, the process executes the cross defined by the program trade order (i.e. price and size).

Reporting the Executed Program Trade Crosses

In this embodiment, as each program trade order is executed, each resulting cross is reported. It is contemplated that in other embodiments the crosses might not be reported. Reporting requirements for crosses are based on the symbol traded. When the process reports on an executed cross, it retrieves the reporting rules that apply for that symbol from the trade reporting data structure 31 and reports on the trade in accordance with those rules. For example, one market center or Trade Reporting authority, away market center 24a, may require crosses to be reported in aggregate and that crosses be reported immediately after the end of the portfolio crossing session; while another market center or Trade Reporting authority, away market center 24b, may require the crosses to be reported individually for each symbol and that they be reported the next morning. If the crosses are to be reported in the aggregate, the process computes the sum of all the shares and the total value of all the shares that were crossed during the portfolio crossing session, combining together all crosses for all traders for the market center symbols being aggregated.

Referring again to FIG. 2, at step 126, the process determines how the symbol executed in the cross is reported, specifically it determines whether the symbol crossed is reported to the tape in aggregate. If the symbol is not to be reported in the aggregate, the cross is reported individually to the tape, as indicated at step 128, and the process proceeds to determine if there are any additional stored program trade orders that need to be executed, as indicated at step 136. If the process determines that the symbol crossed needs to be reported in the aggregate, then, as indicated at step 130, the process adds the volume of shares of the symbol crossed to the running total of aggregate shares that have been crossed in the trading session to that point for all symbols for a specific market center (i.e. parameter AggregateSharesCrossed stored on the trade reporting data structure 31). At step 132, the process determines the total value of the aggregated shares by multiplying the volume of the cross by the price per share of the cross. Then, at step 134, the process adds the computed trade value to the running total of aggregate value of the shares that have been crossed in the trading session to that point for all symbols for a specific market center (i.e. parameter AggregateValueCrossed stored on the trade reporting data structure 31). At step 136, the process then determines if there are any other stored program trade orders that need to be executed. If yes, then the process returns to step 114 and retrieves the next program trade order and processes the order in the manner described above. If, at step 136, it is determined that there are no further program trade orders that need to be executed, then the process reports the value of the aggregate shares crossed parameter and the aggregate volume crossed parameters to the tape, as indicated at step 138. The portfolio crossing session is then complete, as indicated at step 140.

Surveillance of Program Trade Crosses

Only orders that meet the definition of a program trade order are eligible to be treated and executed as a program trade order. In this regard, the process of the present invention checks the program trade orders executed to verify that the basket of crossed orders did in fact meet the definition of a program trade, which, in this embodiment, is a basket of crossed orders having a value of at least one million dollars and including at least fifteen securities' symbols. In this embodiment, the process validates a basket of crossed orders after execution. However, it is contemplated that in other embodiments a basket awaiting execution could be validated prior to execution.

Figure 3A:
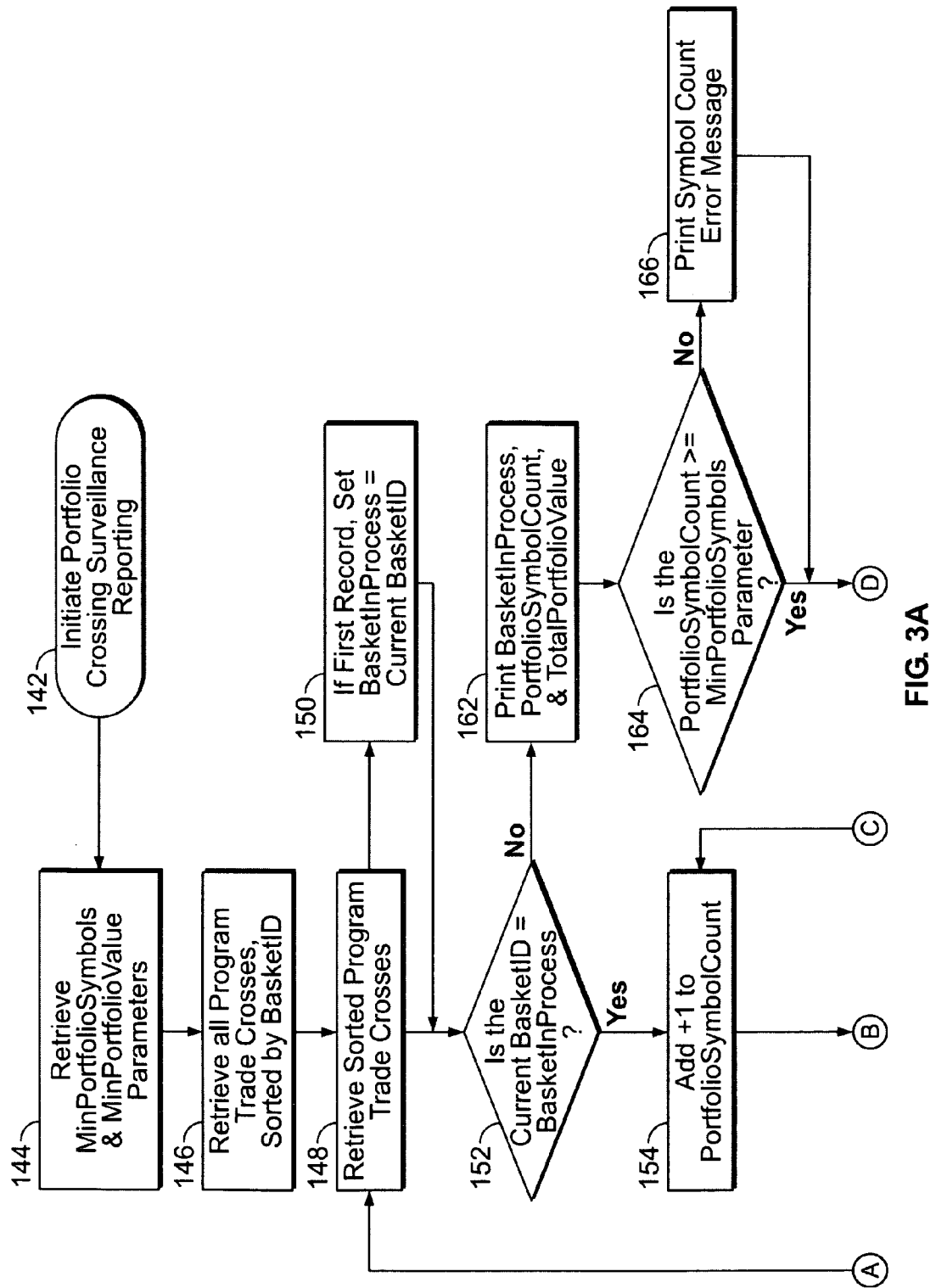
FIGS. 3A-3B illustrates a process implemented by an embodiment of the present invention in performing surveillance on the trades executed through the system.
Figure 3B:
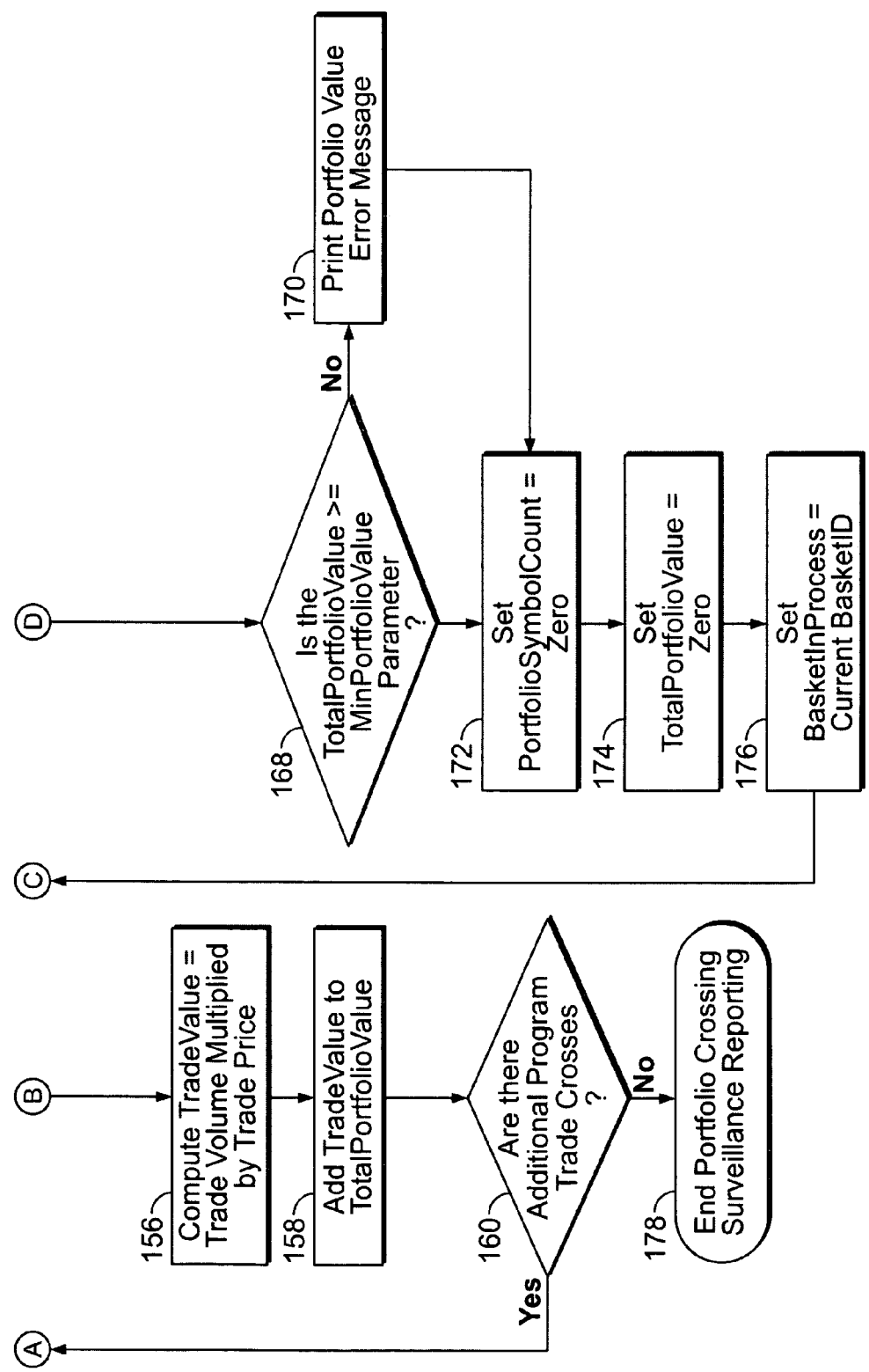

Referring to FIGS. 3A-3B, after completion of the portfolio crossing session, order surveillance takes place. At step 142, the process initiates the portfolio crossing surveillance reporting process. At step 144, the process retrieves the parameters for a valid program trade order (i.e. the parameter which defines the minimum number of symbols that need to be included in the basket ("MinPortfolioSymbols") and the parameter which defines the minimum dollar value for the basket ("MinPortfolioValue"). In this embodiment, these parameters are retrieved from the program trade order parameters data structure 27.

At step 146, the process retrieves all the program trade crosses executed during the portfolio crossing session and sorts these crosses by basket identification number. At step 148, the process retrieves a program trade cross record. If the record retrieved is the first record, the basket-in-process parameter is set to the basket identification number of the retrieved record, as indicated at step 150. At step 152, the process determines whether the basket identification number for the record retrieved is the same as the basket-in-process parameter. If the two values are the same, then the process proceeds to step 154, where the process adds to the parameter that counts the number of symbols in the portfolio basket ("PortfolioSymbolCount"). Then at step 156, the process computes the value of the cross for the record being analyzed which is equal to the cross volume multiplied by the price per share. At step 158, the process keeps a running total of the entire value of the portfolio crossed by adding the value computed for the individual cross at step 156 to the total value at that point. Referring back to step 152, if the basket identification number being processed is not the same as the basket-in-process parameter, the process proceeds to step 162 where, in this embodiment, it prints out the basket identification number for the basket that was just analyzed. It also prints out the total number of symbols that were in the portfolio basket, and it prints out the total value of the crosses that were executed in the basket. At step 164, the process checks to make sure the portfolio basket included the proper number of symbols for a program trade. The process does that by determining whether the number of symbols that crossed within the basket ("PortfolioSymbolCount") is greater than or equal to the parameter that defines the minimum number of symbols that must be present in a portfolio basket ("MinPortfolioSymbols"). If the number of symbols crossed in the portfolio basket is less than the required minimum, the process, as indicated at step 166, prints an error message which indicates that the basket did not contain the requisite number of symbols. If the basket did have at least the minimum number of symbols, the process continues to step 168 where it determines whether the basket of executed crosses satisfied the requisite dollar value as defined by the minimum basket value parameter. If the value of the basket of trades is greater than or equal to the minimum basket value parameter, then the criteria for the minimum basket value has been satisfied, and the process proceeds to step 172. However, if the value of the basket of crosses executed is less than the minimum basket value parameter, the process, as indicated at step 170, prints an error message which indicates that the basket did not meet the minimum value required for a program trade. At steps 172 and 174, the process, re-sets the field for the total number of symbols in the basket to zero and re-sets the field for the total value of the basket of crosses to zero, respectively. At step 176, the process then sets the basket-in-process parameter equal to the basket identification number for the basket now being analyzed and proceeds to step 154.

At step 160, the process determines if there are remaining program trade crosses to analyze. If yes, the process returns to step 148 and repeats the process described above for the next program trade cross record. If there are no further program trade crosses to analyze, then the portfolio crossing surveillance process is complete, as indicated at step 178.

Examples of program trade orders received by a crossing market center 20 are provided below. It should be understood that the order prices discussed in the examples below are by way of example only to illustrate how the process of an embodiment of the invention handles program trade orders of the present invention. For ease of illustration in showing how different symbols have different Trade Reporting requirements, the orders in the examples below have been aggregated according to symbol. As previously described, however, the orders may be stored in any sequence required.

A. EXAMPLE INCOMING PROGRAM TRADE ORDERS

As steps 100 and 102 indicate, program trade orders sent to the crossing market center 20 throughout the day are captured and stored as a record in the program trade order data structure 29.

Example A1

Program Trade Order

In this example, the crossing market center 20 receives the following program trade order from trader 26a:

Order 17: Cross 10,000 Symb01@20.04, Portfolio Cross, BasketID=A127

The record for this order stored in the program trade order data structure 29, in this example, has the following format:

| Symbol | FirmID | Time received | OrderID | BasketID | Quantity | Price |
|---|---|---|---|---|---|---|
| Symb01 | Trader26a | 08:05:13 | 17 | A127 | 10,000 | 20.04 |

Trader 26a has assigned order identification number 17 and basket identification number A127 to this order. The basket order identification number links this order to all of the other orders with a basket order identification number of A127. All of the orders linked together in "basket" A127 constitute the portfolio being traded.

Example A2

Program Trade Order for the Same Symbol, but Different Trader

In this second example, the crossing market center 20 receives the following program trade order from a different trader 26b:

Order 202: Cross 9,200 Symb01@20.05, Portfolio Cross, BasketID=B1743A

The queue of records for Symb01 now appear as follows:

| Symbol | FirmID | Time received | OrderID | BasketID | Quantity | Price |
|---|---|---|---|---|---|---|
| Symb01 | Trader26a | 08:05:13 | 17 | A127 | 10,000 | 20.04 |
| Symb01 | Trader26b | 08:40:35 | 202 | B1743A | 9,200 | 20.05 |

Example A3

Program Trade Order for the Same Symbol but Different Basket

Traders can submit multiple program trade orders for the same symbol if the symbol is a constituent of more than one basket. In this third example, the crossing market center 20 receives the following program trade order from the first trader 26a for symbol Symb01, but for a different basket:

Order 103: Cross 16,000 Symb01@20.10, Portfolio Cross, BasketID=F234

This program trade order is inserted into the queue for symbol Symb01. None of these orders for Symb01 will ever interact with each other. By definition, program trade orders do not interact with any other orders.

| Symbol | FirmID | Time received | OrderID | BasketID | Quantity | Price |
|---|---|---|---|---|---|---|
| Symb01 | Trader26a | 08:05:13 | 17 | A127 | 10,000 | 20.04 |
| Symb01 | Trader26b | 08:40:35 | 202 | B1743A | 9,200 | 20.05 |
| Symb01 | Trader26a | 09:33:24 | 103 | F234 | 16,000 | 20.10 |

Example A4

Program Trade Order for Different Symbol for an Open Basket

In this example, traders must submit cross orders for at least 15 different symbols for the same basket. In this fourth example, the crossing market center 20 receives the following program trade order from the first trader 26a for symbol Symb02 for an open basket, basket A127:

Order 268: Cross 20,000 Symb02@17.57, Portfolio Cross, BasketID=A127

The process inserts the order in the queue for symbol 'Symb02':

| Symbol | FirmID | Time received | OrderID | BasketID | Quantity | Price |
|---|---|---|---|---|---|---|
| Symb02 | Trader26a | 10:17:40 | 268 | A127 | 20,000 | 17.57 |

B. EXAMPLE PORTFOLIO CROSSING SESSION

In this example, the late trading session ends on the crossing market center 20, and the market closes. In this example, away market center 24a and away market center 24b have the following tape reporting requirements for program trade orders executed on the crossing market center:

Crosses in the symbols 'Symb01' and 'Symb03' must be reported to away market center 24a. Away market center 24a requires program trade crosses to be reported in aggregate form at the end of the portfolio crossing session; and Crosses in the symbol 'Symb02' must be reported to away market center 24b. Away market center 24b requires program trade crosses to be reported individually at the beginning of the next trading day following the close of the portfolio crossing session.

Referring to step 110, in this example, shortly after market close, the time equals the time designated by the portfolio crossing time parameter. As indicated at step 112, the portfolio crossing session is initiated.

Example B1

First Portfolio Cross in Symb01 Executes

The queue for symbol 'Symb01' looks like this when the portfolio crossing session commences:

| Symbol | FirmID | Time received | OrderID | BasketID | Quantity | Price |
|---|---|---|---|---|---|---|
| Symb01 | Trader26a | 08:05:13 | 17 | A127 | 10,000 | 20.04 |
| Symb01 | Trader26b | 08:40:35 | 202 | B1743A | 9,200 | 20.05 |
| Symb01 | Trader26a | 09:33:24 | 103 | F234 | 16,000 | 20.10 |

As indicated at steps 114 and 116, the process retrieves the first program trade order and the Trade Reporting rules for the symbol designated therein (i.e. Order 17 and Symb01). At Step 122, the process executes the order, crossing 10,000 shares of Symb01 at $20.04:

Trader 26a Crossed 10,000 Symb01 at $20.04

Then, at step 126, the process determines whether crosses for Symb01 are reported in the aggregate or not. In this example, since Symb01 is reported to away market center 26a, the cross needs to be reported in the aggregate. At step 130, the process adds the cross volume (i.e. 10,000 shares) to the computed variable AggregateSharesCrossed. In step 132, the process computes the value of the cross (i.e. 10,000 shares×$20.04) as $200,400. At step 134, the process then adds the value of the cross ($200,400) to the running total in variable AggregateValueCrossed. In this example, the current values of the aggregated statistics are the following:

AggregateSharesCrossed=10,000

AggregateValueCrossed=$200,400

At step 136, the process determines that there are more program trade orders to execute and returns to step 114 to get the next order.

Example B2

Second Portfolio Cross in Symb01 Executes

At step 114, the process retrieves the second portfolio cross order (i.e. Order 202) and retrieves the Trade Reporting rules for the symbol, which, in this example, happens to be the same as the previously processed order (i.e. Symb01). At step 122, the process executes Order 202 crossing 9,200 shares at $20.05:

Trader 26b Crossed 9,200 Symb01 at $20.05

As with the first program trade order above, at step 126, the process determines that crosses for Symb01 are reported in the aggregate. Therefore, at step 130, the process adds the cross volume (i.e. 9,200 shares) to the computed variable AggregateSharesCrossed. At step 132, it computes the value of the cross as $184,460. As above, the value of the cross is added to the running total for the total value of shares crossed in this symbol. The updated aggregate values for the number of shares crossed and their value for Symb01 at this point are as follows:

AggregateSharesCrossed=19,200 (10,000+9,200)

AggregateValueCrossed=$384,860 ($200,400+$184,460)

Once again, the process at step 136 determines that there are more program trade orders to execute and returns to step 114 to retrieve the next order.

Example B3

Third Portfolio Cross in Symb01 Executes

At step 114, the process retrieves the third program trade order (i.e. Order 103). At step 116, the process, in this example, retrieves the Trade Report rules for Symb01 again. Then at Step 122, the process crosses 16,000 shares at $20.10:

Trader 26a Crossed 16,000 Symb01 at $20.10

The process again determines that crosses for Symb01 are reported in the aggregate so it adds the cross volume (i.e. 16,000 shares) to the running total for the total amount of shares crossed in the specified symbol. Then, at step 132, as before, it computes the value of the cross as $321,600. In step 134, it adds the computed value of the cross to the aggregated running total of the value of crossed shares in the specified symbol. The updated values of the aggregated statistics are the following:

AggregateSharesCrossed=35,200 (10,000+9,200+16,000)

AggregateValueCrossed=$706,460 ($200,400+$184,460+$321,600)

Since there are further program trade orders to execute, the process returns to step 114 to retrieve the next order.

Example B4

First Portfolio Cross in Symb02 Executes

The queue for symbol 'Symb02' looks like this at this point:

| Symbol | FirmID | Time received | OrderID | BasketID | Quantity | Price |
|---|---|---|---|---|---|---|
| Symb02 | Trader26a | 10:17:40 | 268 | A127 | 20,000 | 17.57 |

At steps 114 and 116, the process retrieves the next stored program trade order shown above and the Trade Reporting rules for the symbol designated therein (i.e. Order 268 and Symb02). The process then proceeds to step 122 where it executes the order and crosses 20,000 shares at $17.57:

Trader 26a Crossed 20,000 Symb02@17.57

Then at step 126, as with Symb01, the process determines whether trades for Symb02 are reported in the aggregate or not. In this case, it determines they are not reported in the aggregate (Market Center 24b's rule). The process, therefore, proceeds to step 128 where it reports the cross individually to the Tape and no further processing is required. All the individual crosses that must be reported to Market Center 24b are sent to Market Center 24b the next morning per its requirements.

At step 136, the process determines if there are additional program trade orders that require processing. In this example, there are. The process therefore returns to step 114 and retrieves the next stored order.

Example B5

First Portfolio Cross in Symb03 Executes

The queue for symbol 'Symb03' looks like this at this point:

| Symbol | FirmID | Time received | OrderID | BasketID | Quantity | Price |
|---|---|---|---|---|---|---|
| Symb03 | Trader26a | 10:17:53 | 269 | A127 | 9,000 | 40.40 |

At steps 114 and 116, the process retrieves the next stored program trade order shown above and the Trade Reporting rules for the symbol designated therein (i.e. Order 269 and Symb03). The process then proceeds to step 122 where it executes the order and crosses 9,000 shares at $40.40:

Trader 26a Crossed 9,000 Symb03@40.40

Then, proceeding to step 126, the process determines that crosses in Symb03 need to be reported in the aggregate (Market Center 24a's rule). As such, during steps 130-134, the process continues to increment the AggregateSharesCrossed and AggregateValueCrossed parameters that were started with Symb01, even though this trade is for a different symbol. In this example, the variables AggregateSharesCrossed and AggregateValueCrossed are aggregated values for all crosses in symbols for which Market Center 24a sets the reporting requirements.

Therefore, at step 130, the process adds the cross volume (9,000 shares) to the computed variable AggregateSharesCrossed, and at step 132, it computes the TradeValue by multiplying the cross volume (9,000 shares) by the cross price ($40.40) to derive the TradeValue of $363,600. At step 134, it adds the TradeValue to the computed variable AggregateValueCrossed.

These are the updated values of the aggregate statistics in this example:

AggregateSharesCrossed=44,200 (10,000+9,200+16,000+9,000)

AggregateValueCrossed=$1,070,060 ($200,400+$184,460+$321,600+$363,600)

The process continues processing stored program trade orders in this manner until all the stored program trade orders are processed. Then, at that point, as indicated at steps 136-140, the process reports the aggregated values to Tape and the portfolio crossing session is terminated. In this example, at the beginning of the next trading day, the crossing market center 20 reports the individual trades to Market Center 24b per its requirements.

C. EXAMPLE OF SURVEILLANCE OF PROGRAM TRADE ORDERS

Referring to FIGS. 3A-3B, after the end of the portfolio crossing session, the process implements the portfolio crossing surveillance reporting routine, as indicated at step 142. As described earlier, in this embodiment of the invention, the process does not perform surveillance prior to trade execution. However, it should be understood that in other embodiments, the process may be configured to check if a portfolio of cross orders satisfies the criteria for a program trade prior to the execution of the basket.

At step 144, the process retrieves the parameter that defines the minimum number of symbols that are required in a program trade ("MinPortfolioSymbols") from the program trade order parameters data structure 27. The MinPortfolioSymbols parameter, in accordance with market regulations, is set to 15 symbols in this example. At step 144, the process also retrieves the parameter that defines the minimum value that is required for a program trade ("MinPortfolioValue") from the program trade order parameters data structure 27. The MinPortfolioValue parameter, in accordance with market regulations, is set to $1 million in this example. At step 146, the process retrieves all crosses that were executed and sorts the crosses by basket identification number ("BasketID"). In this example, the first BasketID is BasketID=A127. These are the fifteen crosses that were executed for BasketID A127 during the portfolio crossing session:

| Time received | OrderID | BasketID | Symbol | Quantity | Price |
|---|---|---|---|---|---|
| 08:05:13 | 17 | A127 | Symb01 | 10,000 | 20.04 |
| 10:17:40 | 268 | A127 | Symb02 | 20,000 | 17.57 |
| 10:17:53 | 269 | A127 | Symb03 | 9,000 | 40.40 |
| 11:35:03 | 310 | A127 | Symb04 | 3,000 | 63.95 |
| 13:24:34 | 405 | A127 | Symb05 | 15,000 | 9.43 |
| 14:04:57 | 497 | A127 | Symb06 | 6,000 | 18.25 |
| 15:40:43 | 603 | A127 | Symb07 | 4,000 | 37.37 |
| 15:46:15 | 604 | A127 | Symb08 | 5,500 | 43.16 |
| 16:10:18 | 627 | A127 | Symb09 | 12,000 | 13.49 |
| 16:25:20 | 646 | A127 | Symb10 | 6,000 | 95.73 |
| 17:53:07 | 838 | A127 | Symb11 | 1,000 | 112.24 |
| 18:09:45 | 905 | A127 | Symb12 | 7,500 | 25.74 |
| 18:37:24 | 934 | A127 | Symb13 | 8,000 | 56.67 |
| 19:40:10 | 953 | A127 | Symb14 | 4,000 | 73.37 |
| 19:57:09 | 954 | A127 | Symb15 | 7,000 | 47.26 |

At step 148, the process retrieves the first cross, OrderID=17 in this example. At step 150, since this is the first record, the process sets the parameter for the basket-in-process to A127 (i.e. BasketInProcess=A127). Because of step 150, the current BasketID is equal to the basket-in-process parameter. Therefore, the process moves on to step 154 where it adds one to the parameter that aggregates the number of symbols in the basket (i.e. PortfolioSymbolCount). At step 156, the process computes the value of the order presently being analyzed by multiplying the volume of the cross (10,000 shares) by the cross price ($20.04) to derive a cross value of $200,400. At step 158, the calculated cross value is added to the total value for the basket (i.e. TotalPortfolioValue).

After analyzing the first trade in BasketID A127, the current portfolio values are:

PortfolioSymbolCount=1

TotalPortfolioValue=$200,400

At step 160, the process determines that there are additional crosses to be processed in this basket and returns to step 148 to retrieve the next cross (i.e. OrderID=268). Since the BasketID for this order is the same as the basket-in-process parameter, at step 154, the process adds one to the PortfolioSymbolCount parameters. At step 156, it computes the TradeValue parameter for this cross by multiplying the volume (20,000 shares) by the cross price ($17.57) to derive a value of $351,400. At step 158, it adds the computed cross value for OrderID 268 to the aggregated TotalPortfolioValue parameter.

After analyzing the second trade in BasketID A127, the updated portfolio values are as follows:

PortfolioSymbolCount=2

TotalPortfolioValue=$551,800 ($200,400+$351,400)

The process continues in the manner described above for all of the remaining crosses in BasketID A127, the third through fifteenth crosses in this example. After processing all of Basket ID A127's crosses at Step 148, the process retrieves the next cross, which it recognizes as belonging to a new BasketID (B1743A) and compares it to the BasketInProcess parameter, which is presently set to A127. Since the BasketID values are not the same, the process prints the final PortfolioSymbolCount and the final TotalPortfolioValue for Basket A127 at step 162:

Portfolio A127

Symbol Count: 15

Portfolio Value: $3,864,270

At step 164, the process determines whether the PortfolioSymbolCount parameter for BasketID A127 (i.e. 15 in this example) is greater than or equal to the MinPortfolioSymbols parameter (i.e. 15 in this example). As the parameters equal each other, the process proceeds to step 168, where the process determines whether the TotalPortfolioValue for BasketID A127 (i.e. $3,864,270 in this example) is greater than or equal to the MinPortfolioValue parameter (i.e. $1,000,000 in this example). In this example, the TotalPortfolioValue for BasketID A127 is greater than the MinPortfolioValue required. Therefore, Basket ID A127 met the criteria for a valid program trade.

The process then proceeds to steps 172 and 174 where it zeroes out the PortfolioSymbolCount and the TotalPortfolioValue parameters. At step 176, the process sets the basket-in-process parameter to the latest basket identification number that was retrieved (i.e. BasketInProcess=B1743A). The process then returns to step 154 where it begins the process of analyzing BasketID B1743A.

The process continues to analyze and report the value of all the baskets that had crosses executed in the portfolio crossing session. When the process determines there are no more crosses to analyze at step 160, the portfolio crossing surveillance reporting is complete, as indicated at step 178.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method performed at least partially on a computing system, the method comprising:
   providing a crossing market center and designating a portfolio crossing session start time outside of normal market trading hours;
   throughout the trading day until the designated portfolio crossing session start time, receiving and storing a plurality of program trade orders at the crossing market center using the computing system, wherein each program trade order represents a self-contained cross, contains a basket identification number identifying one program trade of a plurality of program trades on the crossing market center that the program trade order is part of, and contains a specified order price;
   at the designated start time, initiating a portfolio crossing session using the computing system;
   executing the received program trade orders at their specified order prices using the computing system, resulting in portfolio crosses;
   linking together the completed portfolio crosses having the same basket identification number using the computing system; and
   determining whether to validate each program trade by identifying a specific basket identification number in the linked completed portfolio crosses for each program trade using the computing system, wherein validation occurs if a portfolio symbol count for the linked completed portfolio crosses having the specific basket identification number is greater than or equal to a minimum portfolio symbol count for the crossing market center and a total portfolio value for the linked completed portfolio crosses having the specific basket identification number is greater than or equal to a minimum portfolio value for the cross market center.

2. The method of claim 1, further comprising:
   allowing the received program trade orders to be modified or canceled prior to the initiation of the portfolio crossing session.

3. The method of claim 1, further comprising reporting the completed portfolio crosses to the appropriate Tape Reporting authority according to the rules of the Tape Reporting authority using the computing system.

4. The method of claim 3, wherein the rules of the Tape Reporting authority require the completed portfolio crosses to be reported as individual crosses.

5. The method of claim 3, wherein the rules of the Tape Reporting authority require the completed portfolio crosses to be reported in the aggregate.

6. The method of claim 1, further comprising reporting the completed portfolio crosses to the trader that sent the initiating program trade order using the computing system.

7. The method of claim 1, wherein the received and stored program trade orders are not disclosed to the marketplace.

8. The method of claim 1, further comprising reporting any set of portfolio crosses for a basket identification number that did not satisfy the criteria for a valid program trade using the computing system.

9. A method performed at least partially on a computing system, the method comprising:
   providing a crossing market center and designating a portfolio crossing session start time outside of normal market trading hours;
   throughout the trading day until the designated portfolio crossing session start time, receiving and storing a plurality of program trade orders at the crossing market center using the computing system, wherein each program trade order represents a self-contained cross, contains a basket identification number identifying one program trade of a plurality of program trades on the crossing market center that the program trade order is part of, and contains a specified order price;
   at the designated start time, initiating a portfolio crossing session using the computing system;
   executing the received program trade orders at their specified order prices using the computing system, resulting in portfolio crosses;
   linking together the completed portfolio crosses having the same basket identification number using the computing system;
   reporting the completed portfolio crosses to the appropriate Tape Reporting authority according to the rules of the Tape Reporting authority using the computing system; and
   determining whether to validate each program trade by identifying a specific basket identification number in the linked completed portfolio crosses for each program trade using the computing system, wherein validation occurs if a portfolio symbol count for the linked completed portfolio crosses having the specific basket identification number is greater than or equal to a minimum portfolio symbol count for the crossing market center and a total portfolio value for the linked completed portfolio crosses having the specific basket identification number is greater than or equal to a minimum portfolio value for the cross market center.

10. The method of claim 9, further comprising:
    allowing the received program trade orders to be modified or canceled prior to the initiation of the portfolio crossing session.

11. The method of claim 9, wherein the rules of the Tape Reporting authority require the completed portfolio crosses to be reported as individual crosses.

12. The method of claim 9, wherein the rules of the Tape Reporting authority require the completed portfolio crosses to be reported in the aggregate.

13. The method of claim 9, further comprising reporting the completed portfolio crosses to the trader that sent the initiating program trade order using the computing system.

14. The method of claim 9, wherein the received and stored program trade orders are not disclosed to the marketplace.

15. The method of claim 9, further comprising reporting any set of portfolio crosses for a basket identification number that did not satisfy the criteria for a valid program trade using the computing system.

16. A crossing market center for processing program trades, comprising:
    an interface for receiving program trade orders that constitute a plurality of program trades;
    at least one crossing market center memory for storing code for analyzing and processing program trade orders and, having stored thereon, a portfolio crossing session start time outside of normal market trading hours;
    at least one processor for interacting with the interface and executing the stored code for analyzing and processing program trade orders when the interface receives a program trade order, wherein each program trade order represents a self-contained cross, contains a basket identification number identifying one program trade of the plurality of program trades on the crossing market center that the program trade order is part of, and contains a specified order price;

wherein the code, when executed, stores the program trade order and at the designated start time, initiates a portfolio crossing session;

executes the received program trade orders at their specified order prices, resulting in portfolio crosses;

links together the completed portfolio crosses having the same basket identification number; and determines whether to validate each program trade by identifying a specific basket identification in the linked completed portfolio crosses for each program trade, wherein validation occurs if a portfolio symbol count for the linked completed portfolio crosses having the specific basket identification number is greater than or equal to a minimum portfolio symbol count for the crossing market center and a total portfolio value for the linked completed portfolio crosses having the specific basket identification number is greater than or equal to a minimum portfolio value for the cross market center.

17. The method of claim 1, wherein the computing system is one or more programmed computers.

18. The method of claim 9, wherein the computing system is one or more programmed computers.

19. The method of claim 1, wherein the computing system is distributed over several physical locations.

20. The method of claim 9, wherein the computing system is distributed over several physical locations.

21. The crossing market center of claim 16, wherein the crossing market center is a computing system.

22. The method of claim 1, wherein the minimum portfolio symbol count is 15 and the minimum portfolio value is $1,000,000.

23. The method of claim 1, wherein the minimum portfolio symbol count is 15 and the minimum portfolio value is $1,000,000.

24. The crossing market center of claim 16, wherein the minimum portfolio symbol count is 15 and the minimum portfolio value is $1,000,000.

* * * * *